(No Model.) 2 Sheets—Sheet 1.
H. W. CHAMBERLAIN & F. G. HARRIS.
VEHICLE RUNNING GEAR.
No. 298,946. Patented May 20, 1884.
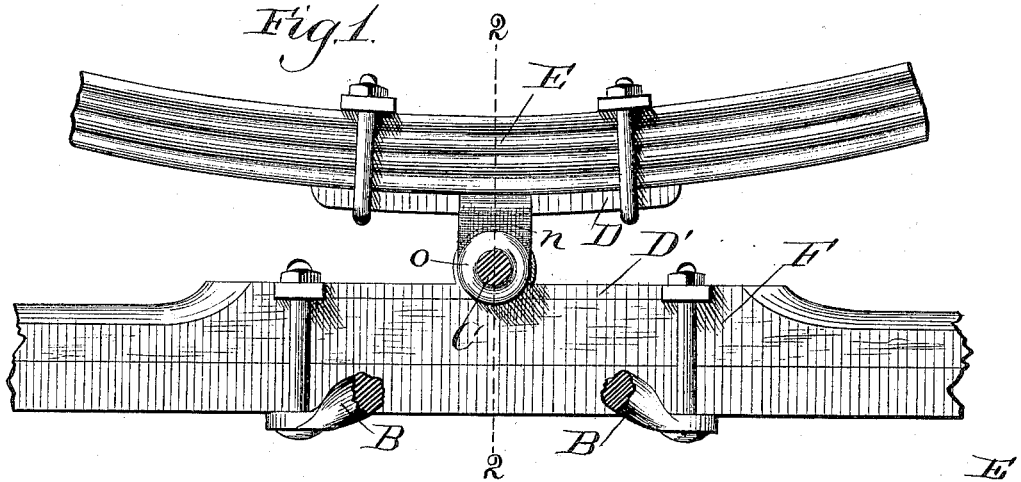
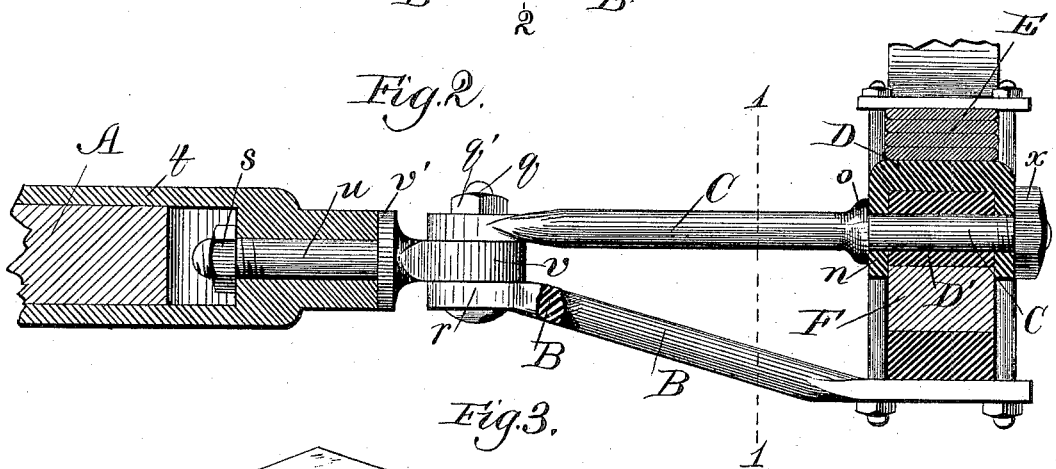
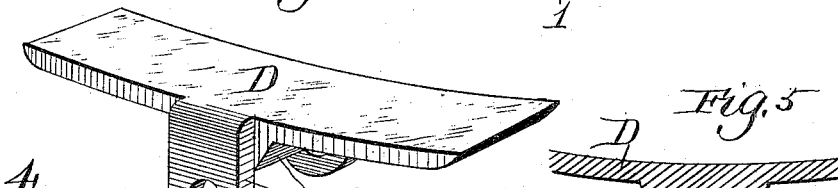
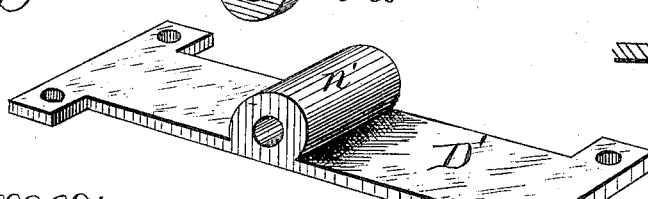
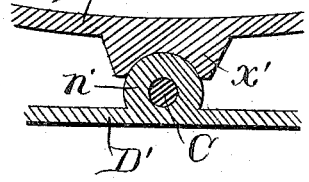
Witnesses:
Chas. E. Gaylord.
Douglas Dyrenforth
Inventor:
Harvey W. Chamberlain
and Fredrick G. Harris
by Dyrenforth & Dyrenforth
their Attorneys.
N. PETERS. Photo-Lithographer, Washington, D. C.

(No Model.) 2 Sheets—Sheet 2.
H. W. CHAMBERLAIN & F. G. HARRIS.
VEHICLE RUNNING GEAR.
No. 298,946. Patented May 20, 1884.
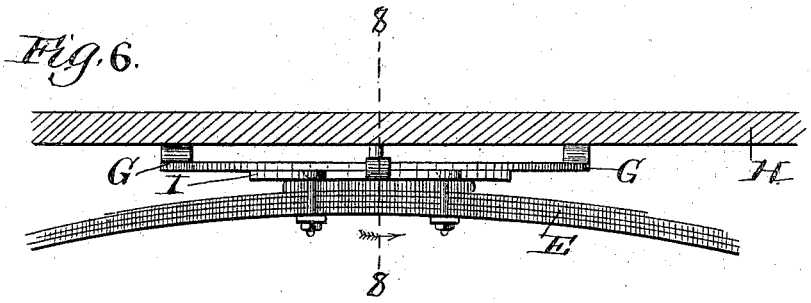
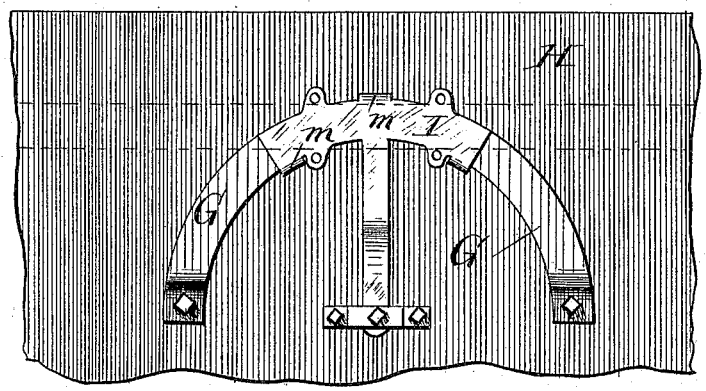
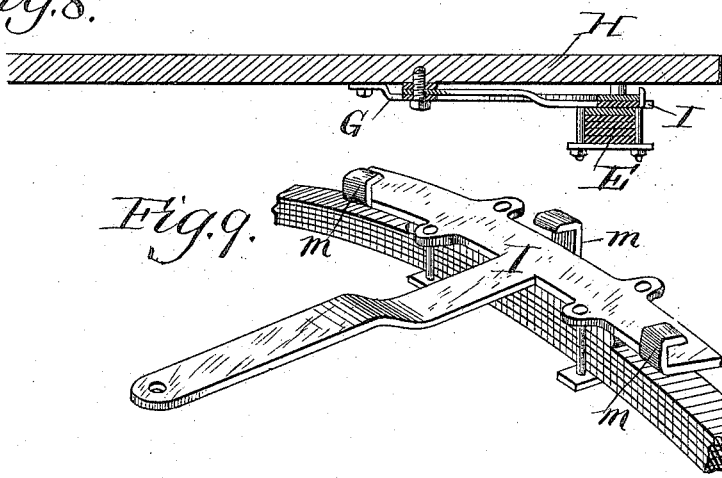
Witnesses:
Chas. E. Gaylord.
Douglas Dyrenforth.
Inventors
Harvey W. Chamberlain and
Fredrick G. Harris
by Dyrenforth & Dyrenforth
their Attorneys.

UNITED STATES PATENT OFFICE.

HARVEY W. CHAMBERLAIN AND FREDRICK G. HARRIS, OF LOCKPORT, ILLINOIS, ASSIGNORS OF ONE-HALF TO MOSES S. GREENEBAUM AND MARX A. LESEM, BOTH OF CHICAGO, ILLINOIS.

VEHICLE RUNNING-GEAR.

SPECIFICATION forming part of Letters Patent No. 298,946, dated May 20, 1884.

Application filed October 20, 1883. (No model.)

*To all whom it may concern:*

Be it known that we, HARVEY W. CHAMBERLAIN and FREDRICK G. HARRIS, citizens of the United States, and residents of Lockport, in the county of Will and State of Illinois, have invented certain new and useful Improvements in Running-Gear for Vehicles; and we hereby declare the following to be a full, clear, and exact description of the same.

Our invention relates to four-wheeled vehicles of all descriptions in which the axles are connected by means of a reach, and it relates particularly to an improvement upon the invention described in Letters Patent No. 285,227, granted to us September 18, 1883.

The object of our invention is to provide a running-gear that shall be not only strong, simple, and thoroughly practical, but by means of which all the parts of the vehicle shall be relieved from the strain incidental to the passage of the wheels over obstructions and rough and uneven surfaces, and the vehicle-body caused to maintain its horizontal position.

To this end our invention consists in providing a swivel-joint which, owing to its position, shall support the whole of the forward gear above the axle and the forward end of the vehicle-body, and be in line with the swiveled reach, the forward end of which passes through and forms the pin of the swivel-joint above the axle, whereby the necessarily harmonious operation of the two swivels will avoid all strain upon the reach, and the wagon-body will be caused to maintain its horizontal position when either of the front wheels from any cause shall assume a position higher or lower than its companion wheel.

Our invention consists, further, in certain details of construction and combinations of parts, all as hereinafter more fully set forth.

Referring to the drawings, Figure 1 is a vertical section on the line 1 1 of Fig. 2, showing a rear view of the forward part of a running-gear embodying our invention; Fig. 2, a vertical central section on the line 2 2 of Fig. 1. Figs. 3 and 4 are detail views in perspective of the mechanism forming the swivel-joint between the forward axle-bed and spring; Fig. 5, a vertical section showing the manner of forming the swivel between the forward axle and spring; Fig. 6, a front sectional view of a vehicle-body secured upon the fifth-wheel, which rests upon the plate provided with guides, the latter being secured to the upper section of the spring; Fig. 7, a bottom view of the fifth-wheel secured to the under side of the vehicle-body and resting within the guides formed upon the guide-plate; Fig. 8, a section taken upon the line 8 8 of Fig. 6, viewed in the direction of the arrow-heads; and Fig. 9, a perspective view of the guide-plate attached to the upper section of the forward spring.

The improvement described in our aforesaid patent is found to be somewhat defective, owing to the fact that the brace R, described therein, being firmly secured to the rear face of the axle A', causes, by the rigidity produced by such attachment, considerable strain upon the body or reach, for the reason that the relative positions of the two swivels prevent them from operating harmoniously when the vehicle is made to pass over obstructions and rough and uneven ground, whereby one front wheel is raised from a level with its companion wheel. We find that this objection is entirely overcome by the construction of which the following is a description. Instead of providing a swivel between the body and upper portion of the forward spring, whereby the running-gear is permitted to oscillate without affecting the horizontal position of the body, we effect the same end, and at the same time overcome the objection above referred to, by attaching the body to the spring in the manner hereinafter described, and by connecting the lower portion of the spring to the axle-bed by means of a swivel operating in union with the swivel formed in the end of the reach, and in line, or nearly so, therewith.

The reach A is provided toward its forward extremity with a swivel composed of the ring $v$, provided with a flange, $v'$, and ending in the screw-threaded pin $u$, secured within the link $s$ by means of a nut, $s'$, to form another swivel-joint, or not screw-threaded, and provided with a head to correspond with the nut $s'$. B B are braces having the annular head $r$ in common, and extending to the under side of the axle, to which they are secured. C is a brace, likewise provided with an annular head, through which and that of the braces B and the ring $v$ a bolt, $q$, passes, fastened by the nut $q'$. The purpose of this mechanism is to permit the vehicle to make a short turn by giving the front wheels a long circle, and to permit a rotary movement of the forward portion of the reach upon the rim portion of the same, to insure the avoidance of strain upon the latter and upon the parts connected with it.

Toward the forward end of the brace C is formed the shoulder $o$, which abuts against one of the downward-projecting bearings, $n$, of the plate D, which is secured underneath, and forms a bar for the spring E. The continuation of the brace C forms a bolt, which passes through the openings in the bearings named through the socket $n'$, formed in the plate D', which is secured directly underneath the plate D to the upper side of the axle-bed F. The brace C is then suitably-secured in position, as by a nut, $x$, as shown in Fig. 2. The purpose of the plate D, having the downward-projecting perforated bearings, and the plate D', provided with the socket $n'$, is to form, by the passage through them of the brace C, a swivel-joint, whereby the parts of the vehicle above the axle may remain unaffected by the passage of the front wheels, over obstructions and rough and uneven ground, and the body and reach be relieved of strain.

The operation of the mechanism just described is as follows: The plates D and D' lie in the same direction, one above the other, the perforations in the bearings $n$, which form right angles with the socket $n'$, coinciding with the said socket for the passage of the brace C through both, to hold them together and form a swivel. The plate D, which conforms at the point of contact to the shape of the socket $n'$, as shown at $x'$, Figs. 3 and 4, with the whole weight of the vehicle above the axle, thus rests upon the said axle through the medium of the socket $n'$ on the plate D', and there is thus provided for the axle and other lower portion of the vehicle what corresponds with a pivotal point, whereby either side of the said lower portion may be raised toward the upper portion without disturbing the horizontal position of the body or in the least straining the said body or reach.

There is no absolute necessity for the position of the plate D underneath the spring E, since it might be made to conform to the concave surface of the spring and rest upon it, when the bearings $n$ would necessarily be longer; but one advantage—viz, having the said plate act as a spring-bar, whereby no additional spring-bar is required—would thus be lost.

The fifth-wheel or half-circle G is secured to the under side of the vehicle-body H, as is clearly shown in Fig. 6 of the drawings, and slides between guides $m$, formed on the plate I, which is secured upon the top of the spring E. It is found that the fifth-wheel, with the construction of the guides hitherto employed, is liable to be jarred out of its position, in which case, if the jarring be sufficiently violent, the body will be seriously strained, if not broken. To obviate this, we provide the plate I with lugs, forming the guides $m$ on one side at or near the center thereof, and two others on the opposite side, near the extremities. These guides are bent inward to form right angles with the body of the plate, and thereby to secure the fifth-wheel from displacement.

The particular arrangement with relation to each other of the various parts of our mechanism hereinbefore described—viz., enumerated downward, that of wagon-body, fifth-wheel, spring, swivel, and axle—affords an advantage lacking in other devices intended to accomplish the same results as our present invention—namely, the advantage of having the spring, upon which rests the entire mechanism above the swivel, always in a horizontal position, whereby the full benefits derived from its elastic quality are attained even when a change occurs in the position of the forward wheels with relation to each other. As hitherto constructed, the spring, bearing immediately upon the axle, partakes of the oscillatory movements of the latter, and thus is occasionally caused to assume a position at an angle more or less acute with its normal position, whereby the benefits derived from its elastic qualities are diminished in greater or less degree under circumstances when its perfect operation is most desirable.

What we claim as new, and desire to secure by Letters Patent, is—

1. In running-gear for vehicles, a reach having two swivel-joints, as shown, in combination with a third swivel-joint formed in line with the swiveled reach, the forward end of the said reach forming the pin of the said third swivel-joint, whereby the extreme swivels shall operate harmoniously to relieve the reach and wagon-body from strain, and at the same time cause the wagon-body to maintain its horizontal position when, from any cause, a front wheel shall assume a position higher or lower than its companion wheel, substantially as described.

2. A vehicle-gear comprising, in combination, a fifth-wheel secured to the under side of the wagon-body, a spring upon which the fifth-wheel is rigidly secured, an axle connected with the said spring by means of a swivel-joint, and a reach the forward end of which forms the pin for the said swivel-joint, the whole being constructed and arranged to operate substantially as described.

3. A swivel-joint in the forward part of a vehicle-gear in line with the reach, comprising the plate D, secured to the lower portion of spring E, and having downward-projecting bearings $n$, provided with apertures, and the plate $D'$, secured to the upper side of the forward axle-bed, and having a socket, $n'$, with which the apertures in the said bearings $n$ coincide, the said parts being secured together by means of a bolt or brace, C, forming the forward end of the swiveled reach, and provided with the nut or head $x$ and the flange $o$, substantially as described.

HARVEY W. CHAMBERLAIN.
FREDRICK G. HARRIS.

In presence of—
MOSES S. GREENEBAUM,
DOUGLAS DYRENFORTH.